US006273942B1

(12) United States Patent
Jersby

(10) Patent No.: US 6,273,942 B1

(45) Date of Patent: Aug. 14, 2001

(54) MOISTURE ABSORPTION APPARATUS

(75) Inventor: Ralf Jersby, Täby (SE)

(73) Assignee: Auxilium Jersby Aktiebolag (SE)

( * ) Notice: Subject to any disclaimer, the term of this patent is extended or adjusted under 35 U.S.C. 154(b) by 0 days.

(21) Appl. No.: 09/452,476

(22) Filed: Dec. 1, 1999

(30) Foreign Application Priority Data

Oct. 7, 1999 (SE) .................................................. 9903604

(51) Int. Cl.[7] .................................................... B01D 53/26

(52) U.S. Cl. ................................ 96/118; 96/147; 55/424

(58) Field of Search .......................... 95/91; 96/118–120, 96/147, 148; 55/424

(56) References Cited

U.S. PATENT DOCUMENTS

| | | | | |
|---|---|---|---|---|
| 1,914,941 | * | 6/1933 | Downs | 96/120 |
| 1,920,915 | * | 8/1933 | Poggel | 96/120 |
| 2,649,923 | * | 8/1953 | Woppman | 96/147 |
| 3,221,478 | * | 12/1965 | Norton | 96/120 |
| 3,277,636 | * | 10/1966 | Hemmerlein | 96/119 |
| 5,087,273 | * | 2/1992 | Ward | 96/147 |
| 5,148,613 | * | 9/1992 | Cullen | 96/119 X |
| 5,676,739 | | 10/1997 | Gustafsson | 96/119 |
| 5,683,499 | * | 11/1997 | Kiyani | 96/147 |

FOREIGN PATENT DOCUMENTS

| | | | | |
|---|---|---|---|---|
| 116239 | * | 8/1984 | (EP) | 96/119 |
| 0212029 | | 3/1987 | (EP) . | |
| 2506175 | * | 11/1982 | (FR) | 96/118 |
| 58-020222 | * | 2/1983 | (JP) | 96/119 |
| 58-199020 | * | 11/1983 | (JP) | 96/118 |
| 05-293329 | * | 11/1993 | (JP) | 96/118 |
| 06-142436 | * | 5/1994 | (JP) | 96/118 |
| 06-210123 | * | 8/1994 | (JP) | 96/118 |
| WO97/43193 | | 11/1997 | (WO) . | |
| WO99/61345 | | 12/1999 | (WO) . | |

OTHER PUBLICATIONS

International Search Report (in English) issued Jan. 29, 2001 in a related application.

* cited by examiner

*Primary Examiner*—Robert H. Spitzer

(74) *Attorney, Agent, or Firm*—Ostrolenk, Faber, Gerb & Soffen, LLP

(57) ABSTRACT

A moisture absorption apparatus includes an elongated flexible plastic tube having sealed upper and lower end portions, one or several wall openings disposed in a wall portion adjacent to the upper end portion, a tubular desiccant container having gas and liquid permeable walls disposed radially inwardly of the wall openings, and a spacing element interposed between the tube wall and the desiccant container or integrated in the desiccant container to prevent liquid formed in the container from leaving the apparatus through the wall openings.

15 Claims, 3 Drawing Sheets

MOISTURE ABSORPTION APPARATUS

FIELD OF THE INVENTION

The present invention relates to the field of dehumidification, in particular, to a tubular moisture absorption apparatus provided with a desiccant in an upper chamber. On contact with moisture, the desiccant forms an aqueous solution which is received by a liquid collection chamber in communication with the desiccant chamber and disposed beneath it.

BACKGROUND OF THE INVENTION

The present invention departs from the tubular moisture-absorbing device disclosed in U.S. Pat. No. 5,676,739 (Gustafsson) designed for vertical disposition in, for instance, a closed steel container for transport of humidity-sensitive goods. The device is made of a polymer coated board which provides a required stiffness. Starting from its upper end, it comprises, in a longitudinal direction, a chamber with a moisture-absorbing material, such as calcium chloride, which forms an aqueous solution on contact with humid air. The salt solution is continuously drained into a lower liquid collection chamber provided in the form of a plastic container with which the upper chamber is in communication. The particulate desiccant material is retained in the upper chamber by a sieve means comprising a non-return valve. Contact of the desiccant with ambient air is ensured by a netting element located in front of an opening in the wall of the upper chamber. The netting element is designed to prevent the aqueous solution from leaving the upper chamber through it rather than through the sieve means.

While the moisture-absorbing device of Gustafsson has been shown to function well in industrial practice, there is room for improvement. Manufacture of the device of the '739 patent necessitates folding and longitudinal gluing of a sheet of plastic board to provide a tubular structure, manufacturing and attaching several plastic parts, such as the sieve means and the netting element, to the tubular structure by gluing, and attaching the plastic container forming the lower chamber to the sieve means, etc.

OBJECTS OF THE INVENTION

A main objective of the present invention is to provide an apparatus of the aforementioned kind which is easier and cheaper to manufacture while retaining the advantageous properties of the device of U.S. Pat. No. 5,676,739.

Further objectives of the invention will become evident from the following summary of the invention, the drawings, the description of preferred embodiments, and the claims.

SUMMARY OF THE INVENTION

The moisture absorption apparatus of the invention comprises an elongated flexible plastic tube having sealed upper and lower ends, one or several wall openings disposed in a wall portion adjacent to the upper end portion, a tubular desiccant container holding a deliquescent desiccant and having gas and liquid permeable walls disposed radially inwardly of said one or several wall openings, and spacer means, preferably of tubular shape, interposed between the plastic tube wall and the desiccant container and/or integrated in the desiccant container to prevent liquid formed in the container from leaving the apparatus through the wall openings. It is preferred that the spacer means is incorporated into the desiccant container. The desiccant container of the invention is of a gas and liquid permeable material, such as a woven or a non-woven plastic material. In the context of the present invention, "axial(ly)" refers to the tube axis while "radial(ly)" refers to a direction perpendicular thereto. Since the apparatus of the invention is designed for use in an upright position, the terms "upper" and "lower" are referenced relative to this working position. The apparatus is kept in the working position by, for instance, a wire fastened at an eye provided at the upper end of the plastic tube, and its other end being held at a suitable point of fixation along an inner wall of a steel container or other compartment.

According to a preferred aspect of the invention, a lumen restrictor disposed in-between the upper and lower ends divide the tube into an upper moisture absorption chamber and a lower liquid collecting chamber.

The present invention is based on the concept that the liquid formed in the container by the absorption of humidity by the desiccant should be kept away from the tube wall to prevent accidental spillage through the wall openings. This is accomplished through impeding flow in the radial direction by the spacer means. The spacer means may be separate from the container or integrated into the container's outer (in a radial direction) wall portion. If separate, a flexible hose of a netted plastic material such as, for instance, the tubular plastic devices used for protecting glass bottles from damaging each other, may be interposed between the container and the wall. If integral, a tubular peripheral portion of the container may be shaped or treated to impede radial flow. For instance, the container may be made of a non-woven plastic material, such as polyethylene terephthalate, in such a manner that its inner wall portion is more dense than its peripheral wall portion, that is, the average distance between filaments is smaller in the inner wall portion than in the outer wall portion. Alternatively or additionally, the filaments of the outer wall portion may be chemically treated to make them more hydrophobic or the filaments of the inner wall portion may be chemically treated to make them more hydrophilic, or both, thus using surface tension phenomena to keep the aqueous solution of the desiccant away from the tube wall.

A preferred desiccant is calcium chloride or desiccant mixtures containing calcium chloride, but in principle, all desiccants which become deliquescent on contact with humid air can be used. The aqueous solution of the desiccant flows through the lumen restrictor into the liquid collection chamber. A non-return valve may be arranged at the restrictor but this is not critical for the performance of the apparatus of the invention; its only function is to prevent liquid from flowing back into the upper chamber and out from there in the event the apparatus falls on the container floor if the suspending wire breaks or comes loose.

The lumen restrictor of the invention preferably supports the desiccant container when the apparatus of the invention is in an upright position. In the absence of a lumen restrictor or if so desired, the desiccant container can be fastened, for instance, at the sealed upper end of the plastic tube.

The sealing of the tube ends and/or the provision of the lumen restricting means can be obtained by any appropriate technique, such as heat or microwave welding or gluing.

To prevent moist air from prematurely entering into the apparatus of the invention the wall openings are suitably covered by a removable seal, such as a plastic sheet applied to outside of the wall portion in which the openings are formed using a non-permanent adhesive of appropriate strength.

The upper and lower end sealed portions of the plastic tube are preferably oriented in the same radial direction, that is, as if the tube were sealed while being flattened against a flat surface. If the sealed portions are arranged in this manner, it is preferred for at least some of the wall openings to be disposed in a wall portion aligned between one or both pairs of axially corresponding radial ends of the sealed portions, i.e., the left ends or the right ends of the sealed portions. In this manner, the apparatus of the present invention, when suspended in a working position and resting with ore side against a steel container or similar wall, will align its sealed ends in parallel with the external wall. Plastic tube wall openings disposed in a wall portion axially disposed between corresponding radial ends of the upper and lower plastic tube sealed portions therefore will be unlikely to abut against an external wall. Such abutment would prevent or at least hinder the apparatus of the invention from exerting its beneficial humidity absorption effect.

The invention will now be explained in more detail with reference to the drawings illustrating the preferred embodiments of the invention.

BRIEF DESCRIPTION OF THE PREFERRED EMBODIMENTS

Figure 1:
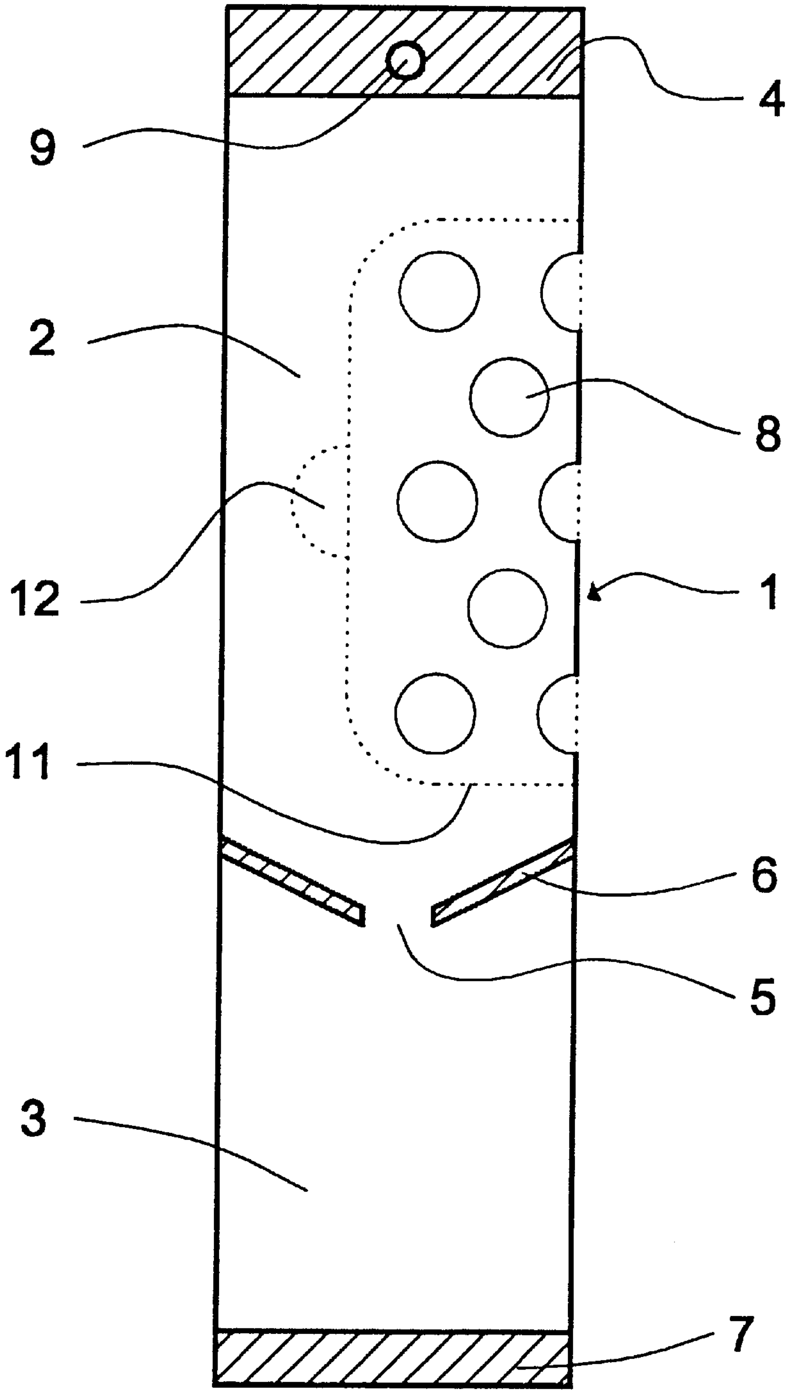
FIG. 1 is a cross-sectional view of a first embodiment of the moisture absorption apparatus of the invention in a flattened state without the desiccant container.
Figure 2:
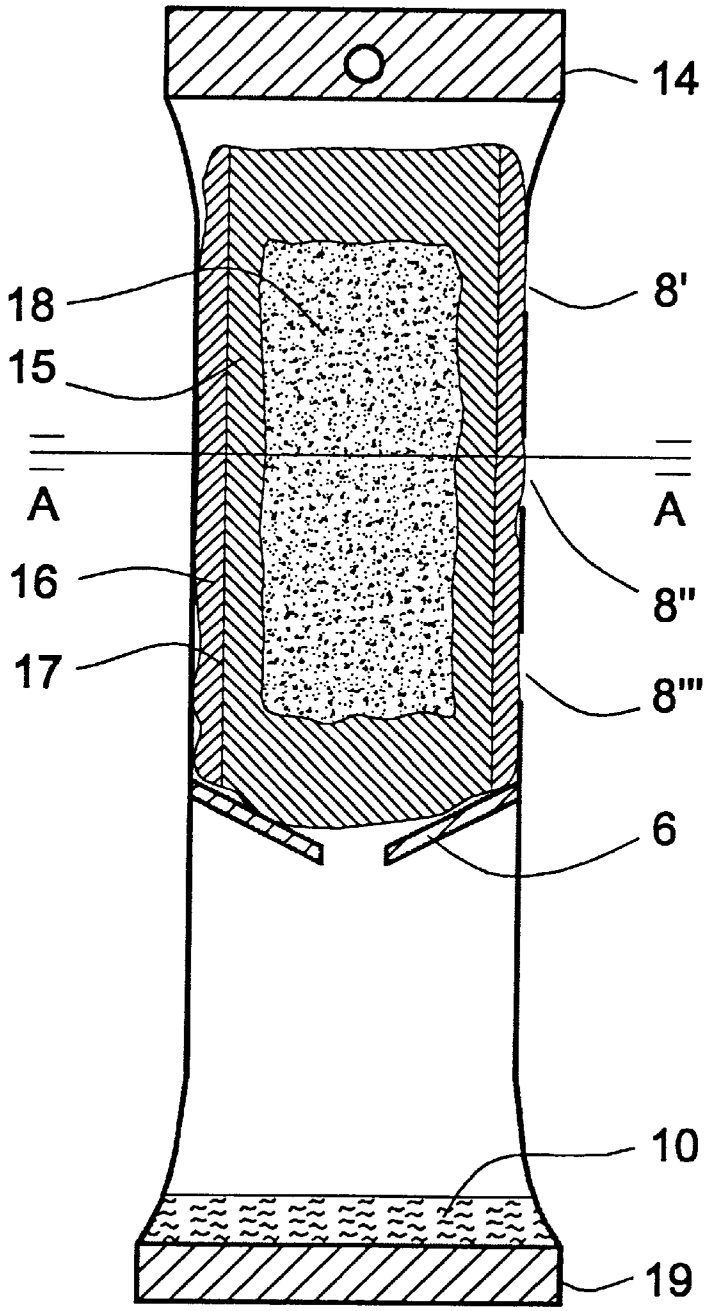
FIG. 2 is a corresponding view of the apparatus of FIG. 1, but in a non-flattened state and upright working position, having a desiccant container with integral spacer means inserted therein.
Figure 3:
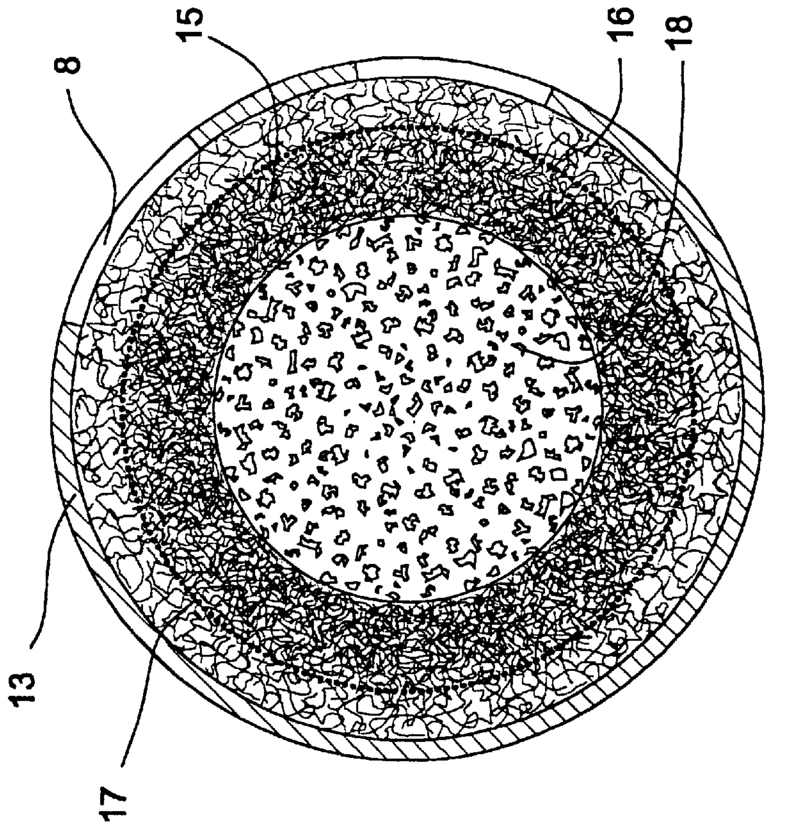
FIG. 3 is a cross-sectional view A—A of the apparatus of FIGS. 1 and 2.

The first embodiment of the moisture absorption apparatus of the invention illustrated in FIGS. 1–3 comprises an elongated semi-transparent polyethylene plastic tube 1 with heat seal portions 4,7 at its upper and lower ends, respectively. In the upper seal portion 4 a central eye 9 is provided for fastening the apparatus in an upright position by means of a wire or the like (not shown). By means of a welded restriction 6 having a central opening 5, the main portion of the tube extending between the seal portions 4,7 is divided into an upper chamber 2 for moisture absorption and a lower chamber 3 for collection of liquid. A passage through opening 5 provides for communication between the chambers 2 and 3. In the wall of the upper chamber 2, a number of circular openings 8,8',8",8'" provide for access to the ambient air. In the ready-to-use apparatus, the plastic tube wall openings 8 are covered by a removable plastic sealing sheet 11 with a gripping tongue 12.

In FIG. 1, the sealed but, for the sake of clarity, empty tube 1 is shown in a flattened position. In FIG. 2, the same tube is shown with the desiccant container inserted therein. The air in the upper chamber 2 is in communication with ambient air through tube wall openings 8,8',8",8'". The container is of a non-woven material, as evident from FIG. 3, and consists of a (radially) inner portion 15 of higher density and an outer portion 16 of lower density, that is, a portion having larger interstices on average between its filaments. Materials of this kind are marketed in sheet form by Scandfilter AB, Svenljunga, Sweden (PET filter media, weight about 160 g/m$^3$, thickness about 14 mm). Enclosed in the desiccant container is a particulate desiccant 18, such as anhydrous calcium chloride. The border 17 between the inner 15 and outer 16 portions serves as a barrier in the radial travel of the desiccant solution to thereby divert the flow thereof in a downward direction. The solution 10 leaves the upper chamber 2 through the opening 5 and accumulates at the bottom of the lower chamber 3. For reasons of clarity, the thickness of tube wall 13 in FIG. 3 has been highly exaggerated. Its normal thickness would be in the range of 0.5 mm or less.

Instead of having two tubular portions 15 and 16, the interstices of the container wall could be made to increase continuously in a radial direction. This would broaden the border 17 into a border zone, but the technical effect would remain the same.

It is possible to make the outer desiccant container portion corresponding to portion 16 water-repellent by chemical treatment, for instance with a non-curing or curing silicone, whereby the radial spread of the aqueous desiccant solution would also be impeded.

The desiccant container can be manufactured from a radially layered tube. The radially layered tube is cut to pieces of appropriate length which are each closed at one end thereof, filled with desiccant, and closed at the other end thereof by gluing or cautious welding, for instance.

In FIG. 2, the plastic tube wall openings 8',8",8'" are disposed in a wall portion aligned between one pair of axially corresponding radial ends 14,19, i.e, the right side ends as viewed in FIG. 2, of seal portions 4,7, which arrangement prevents the plastic tube wall openings 8',8",8'" to be accidentally closed by the apparatus of the invention abutting against an external steel container or similar wall when suspended in a working position. The plastic sheet 11 covering the plastic tube wall openings 8',8",8'" to protect the desiccant prior to use has been removed and thus is not shown in FIG. 2 (nor in FIGS. 3 and 4).

Figure 4:
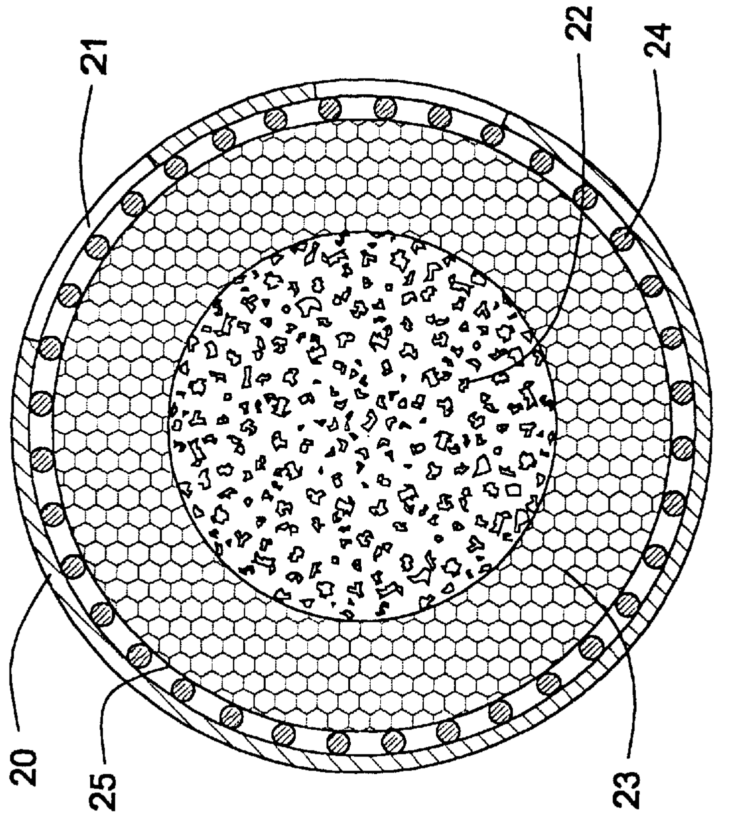
FIG. 4 is a corresponding cross-sectional view of a second embodiment of the invention with a separate spacer means.

The second embodiment of the invention illustrated in FIG. 4 comprises a desiccant container having a uniform wall 23 of a three-dimensional net of plastic fibers enclosing the particulate desiccant 22. The desiccant solution can spread freely in all directions in the desiccant container wall 23 but its contact with the plastic tube wall 20 is prevented by a net 24 of coarse polyethylene fibers provided in the form of a hose circumferentially interposed between the desiccant container wall 23 and the plastic tube wall 20. The solution is thus prevented from leaving the apparatus through tube wall openings 21. There is also a border 25 that serves as a barrier that prevents the desiccant from traveling radially, diverting flow downward much as border 17 does in the first embodiment. The second embodiment of the invention has the additional advantage that the wall thickness of its desiccant container can be made as thin as the strength of the material used will allow, thus saving space for additional desiccant. In this case, a desiccant container having walls of a woven material is particularly appropriate.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A moisture absorption apparatus comprising:

an elongated flexible plastic tube having sealed upper and lower end portions, the tube having a wall portion adjacent to the upper end portion, and at least one wall opening disposed in the wall portion of the tube, a substantially tubular desiccant container holding a deliquescent desiccant and having gas and liquid permeable walls, the container being disposed radially inwardly from the at least one wall opening; and a spacer between the plastic tube wall and the desiccant container to prevent liquid from leaving the apparatus through the at least one wall opening.

2. The apparatus of claim 1, wherein the spacer is tubular in shape.

3. The apparatus of claim 1, wherein the spacer is a separable element from the desiccant container.

4. The apparatus of claim 3, wherein the spacer is in the form of a flexible netted hose.

5. The apparatus of claim 1, wherein the spacer is formed as part of the desiccant container.

6. The apparatus of claim 5, wherein the tube has an inner surface, the spacer has an outer diameter which essentially corresponds to the inner diameter of the tube so that the outer surface of the desiccant container abuts the inner surface of the tube.

7. The apparatus of claim 6, wherein the container comprises tubular inner and outer portions, and the spacer is comprised of the outer portion.

8. The apparatus of claim 7, wherein the inner and outer portions are made of a non-woven plastic material, and the density of the outer portion is lower than the density of the inner portion.

9. The apparatus of claim 7, wherein the outer portion has been treated with a water-repellant.

10. The apparatus of claim 9, wherein the water-repellant comprises silicone.

11. The apparatus of claim 1, further comprising an eye disposed in the sealed upper end portion and a removable plastic sheet covering the at least one wall opening.

12. The apparatus of claim 11, wherein at least one of the wall openings is disposed in a wall portion axially aligned between corresponding lateral ends of the sealed upper and lower end portions.

13. The apparatus of claim 1, wherein the sealed upper and lower end portions are oriented in the same radial direction relative to each other.

14. The apparatus of claim 1, further comprising a lumen restrictor disposed between the desiccant container and the sealed lower end portion.

15. The apparatus of claim 14, wherein the lumen restrictor is arranged for supporting the container.

* * * * *